US012106716B2

(12) United States Patent
Zhou et al.

(10) Patent No.: US 12,106,716 B2
(45) Date of Patent: Oct. 1, 2024

(54) DRIVE CURRENT REGULATING CIRCUIT, COLOR DEVIATION CORRECTION METHOD, DEVICE AND STORAGE MEDIUM

(71) Applicant: HKC CORPORATION LIMITED, Shenzhen (CN)

(72) Inventors: Renjie Zhou, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/332,229

(22) Filed: Jun. 9, 2023

(65) Prior Publication Data

US 2024/0087521 A1 Mar. 14, 2024

(30) Foreign Application Priority Data

Sep. 13, 2022 (CN) ......................... 202211107078.4

(51) Int. Cl.
*G09G 3/3233* (2016.01)

(52) U.S. Cl.
CPC ... *G09G 3/3233* (2013.01); *G09G 2300/0842* (2013.01); *G09G 2320/0233* (2013.01); *G09G 2320/0242* (2013.01)

(58) Field of Classification Search
CPC ......... G09G 3/3233; G09G 2300/0842; G09G 2320/0233; G09G 2320/0242
See application file for complete search history.

(56) References Cited

U.S. PATENT DOCUMENTS

2013/0050288 A1 2/2013 Kang et al.
2014/0139499 A1* 5/2014 Hussain ................. H05B 45/46 345/204
2014/0176020 A1* 6/2014 Zhang ................ H05B 41/2856 315/309
2017/0264076 A1* 9/2017 Moyer .................. H01S 5/0428
(Continued)

FOREIGN PATENT DOCUMENTS

CN 103606354 A 2/2014
CN 106843354 A 6/2017
(Continued)

OTHER PUBLICATIONS

First Office Action issued in counterpart Chinese Patent Application No. 202211107078.4, dated Oct. 20, 2022.
(Continued)

*Primary Examiner* — Jeff Piziali
(74) *Attorney, Agent, or Firm* — Westbridge IP LLC

(57) ABSTRACT

Disclosed are a drive current regulating circuit, a color deviation correction method, a display device and a storage medium. The color deviation correction method includes: determining that the switching tube is turned on in the current regulating module in response to that a resistor in the current input module is turned on, and regulating the input voltage in response to that the switching tube is turned on to obtain a drive voltage, and outputting the drive voltage to a source of the first transistor in the current output module, and compensating for a drive current of the light-emitting diode in the current output module output from the first transistor, to correct a color deviation of the light-emitting diode.

7 Claims, 4 Drawing Sheets

(56) References Cited

U.S. PATENT DOCUMENTS

| | | | | |
|---|---|---|---|---|
| 2018/0292850 | A1* | 10/2018 | Chen | G05F 1/56 |
| 2021/0134238 | A1* | 5/2021 | Zhang | G09G 3/3688 |
| 2021/0225278 | A1* | 7/2021 | Ling | G09G 3/3233 |
| 2021/0366396 | A1 | 11/2021 | Xuan et al. | |

FOREIGN PATENT DOCUMENTS

| | | | |
|---|---|---|---|
| CN | 108335674 | A | 7/2018 |
| CN | 108898993 | A | 11/2018 |
| CN | 109509449 | A | 3/2019 |
| CN | 111583864 | A | 8/2020 |
| CN | 113178167 | A | 7/2021 |
| CN | 214336294 | U | 10/2021 |
| CN | 114664227 | A | 6/2022 |
| CN | 114664235 | A | 6/2022 |
| CN | 114974116 | A | 8/2022 |
| CN | 115188330 | A | 10/2022 |
| JP | 2000284753 | A | 10/2000 |
| KR | 20200036588 | A | 4/2020 |

OTHER PUBLICATIONS

Geng et al., Design of a High Precision Drive Circuit with Adjustable Output and Constant Current, Spacecraft Recovery & Remote Sensing, vol. 41, No. 3, pp. 86-92, dated Jun. 15, 2020.
Grant Notification issued in counterpart Chinese Patent Application No. 202211107078.4, dated Nov. 7, 2022.
International Search Report and Written Opinion issued in corresponding PCT Application No. PCT/CN2023/094616, dated Sep. 6, 2023.

* cited by examiner

DRIVE CURRENT REGULATING CIRCUIT, COLOR DEVIATION CORRECTION METHOD, DEVICE AND STORAGE MEDIUM

CROSS-REFERENCE TO RELATED APPLICATIONS

This application claims priority to Chinese Patent Application No. 202211107078.4, filed on Sep. 13, 2022, the entire contents of which are incorporated herein by reference.

TECHNICAL FIELD

The present disclosure relates to the technical field of liquid crystal displays, and in particular to a drive current regulating circuit, a color deviation correction method, a display device and a computer-readable storage medium.

BACKGROUND

The organic light-emitting diode (OLED) display, as an active light-emitting display with the advantages of high density, wide vision, high response speed, low power consumption, etc., is one of the main technologies in the new display technologies. The OLED is composed of a red light-emitting diode, a green light-emitting diode, and a blue light-emitting diode, which is the same as the liquid crystal display (LCD). However, the light-emitting rate of the light-emitting diode is different in the OLED display. For example, the light-emitting rate of the blue light-emitting diode is lower than the light-emitting rate of the green light-emitting diode and the red light-emitting diode. To make the brightness of the blue light-emitting diode equal to the red light-emitting diode and the green light-emitting diode, the drive current output to the blue light-emitting diode should be increased, otherwise a color deviation will exist in the display screen.

In the related art, by changing the distribution area of the light-emitting diode in the display panel, the drive current will be increased. For example, by increasing the pixel area of the blue light-emitting diode, the drive current passing through the blue light-emitting diode will be consistent with the drive current passing through the red light-emitting diode and the green light-emitting diode, so that the light-emitting rate of the blue light-emitting diode is equal to the light-emitting rate of the green light-emitting diode, and the red light-emitting diode. However, the pixel area of the green light-emitting diode and the red light-emitting diode will be reduced due to the increased pixel area of the blue light-emitting diode. In this case, not only the resolution of the display screen will be reduced and the circuit layout in the OLED display panel will be changed, but also the production cost and the design cost will be increased when the screen viewing is affected, which is not conducive to the development of the OLED display.

SUMMARY

The main purpose of the present disclosure is to provide a drive current regulating circuit, a color deviation correction method, a display device and a computer-readable storage medium, aiming to solve the technical problem that the display resolution is reduced and the production cost and the design cost are high during the process of improving the brightness of the light-emitting diode.

In order to solve the above objectives, the present disclosure provides a drive current regulating circuit including: a current input module, a current regulating module and a current output module, a first terminal of a first resistor in the current input module is used as an input terminal of the current input module for receiving an input voltage, a connection point between a second terminal of the first resistor and a first terminal of a second resistor in the current input module is used as an output terminal of the current input module, and is connected to an input terminal of the current regulating module, an output terminal of the current regulating module is connected to an input terminal of the current output module, and in response to that the first resistor is switched on and the second resistor is not switched on, the current regulating module includes a first switching tube and a voltage follower, a grid of the first switching tube is connected to the second terminal of the first resistor, and a drain of the first switching tube is for receiving a power supply voltage, a source of the first switching tube is connected to a positive input terminal of the voltage follower, and an output terminal of the voltage follower is connected to the input terminal of the current output module, or in response to that the first resistor is not switched on and the second resistor is switched on, the current regulating module includes a second switching tube, a grid of the second switching tube is connected to the first terminal of the second resistor, a source of the second switching tube is for receiving the power supply voltage, and a drain of the second switching tube is connected to the input terminal of the current output module.

In an embodiment, the current output module includes a first transistor, a second transistor, and a light-emitting diode, a control terminal of the first transistor is connected to an output terminal of the second transistor, an input terminal of the first transistor is connected to the output terminal of the current regulating module, an output terminal of the first transistor is connected to a positive electrode of the light-emitting diode, and a negative electrode of the light-emitting diode is grounded, and an input terminal of the second transistor is for receiving a data signal, and a control terminal of the second transistor is for receiving a scanning signal.

In an embodiment, the current output module further includes a storage capacitor, and a first terminal of the storage capacitor is connected to a connection point between the first transistor and the current regulating module, and a second terminal of the storage capacitor is connected to a connection point between the first transistor and the second transistor.

The present disclosure further provides a color deviation correction method including:

determining a switching tube which is turned on in the current regulating module in response to that a resistor in the current input module is switched on, and regulating the input voltage based on the switching tube to obtain a drive voltage, and outputting the drive voltage to a source of the first transistor in the current output module, and compensating for a drive current of the light-emitting diode in the current output module output from the first transistor, to correct a color deviation of the light-emitting diode.

In an embodiment, the determining the switching tube which is turned on in the current regulating module in response to that the resistor in the current input module is switched on, and regulating the input voltage based on the switching tube to obtain the drive voltage includes:

determining that the first switching tube in the current regulating module is turned on in response to that the first resistor in the current input module is switched on, and regulating the input voltage output from the first switching tube to the voltage follower, to obtain the drive voltage in response to that the first switching tube is turned on.

In an embodiment, the determining the switching tube which is turned on in the current regulating module in response to that the resistor in the current input module is switched on, and regulating the input voltage based on the switching tube to obtain the drive voltage includes:

determining that a second switching tube is turned on in the current regulating module in response to that the second resistor in the current input module is switched on, and regulating the input voltage passing through the second switching tube to obtain the drive voltage in response to that the second first switching tube is turned on.

In addition, to solve the above objectives, the present disclosure further provides a display device including:

a memory;

a processor; and a computer processing program stored in the memory and executable on the processor, when the computer processing program is executed by the processor, the color deviation correction method as mentioned above is implemented.

In addition, to solve the above objectives, the present disclosure further provides a non-transitory computer-readable storage medium, a computer processing program is stored in the non-transitory computer-readable storage medium, when the computer processing program is executed by a processor, the color deviation correction method as mentioned above is implemented.

In the present disclosure, the drive current regulating circuit of the existing light-emitting diode is improved, and the current regulating module is triggered according to the turned-on state of the elements in the current input module. Through the current regulating module, the input voltage transmitted from the current input module is combined with the power supply voltage that is transmitted into the current regulating module when the current regulating module is turned on, so that the drive voltage output to the current output module will be increased, thereby increasing the drive current output to the light-emitting diode, such as the drive current output to the blue light-emitting diode. In this way, the drive current of the light-emitting diode can be changed without changing the distribution area of the light-emitting diode in the display panel, which not only can correct color deviation, but also can avoid the decreased resolution caused by color deviation correction.

The realization of the objective, functional characteristics, and advantages of the present disclosure are further described with reference to the accompanying drawings.

DETAILED DESCRIPTION OF THE EMBODIMENTS

It should be understood that the embodiments described here are only for explaining the present disclosure, which is not intended to limit the present disclosure.

In the technical solutions of the embodiments of the present disclosure, the drive current regulating circuit of the existing light-emitting diode is improved, and the input voltage in the current input module is transmitted into the current regulating module by connecting the current input module and the current regulating module. In this way, based on the received input voltage and the power supply voltage, the drive voltage output to the current output module can be increased through the current regulating module.

In the related art, the distribution area of the light-emitting diode is changed to make the drive current of the light-emitting diode in each pixel equal to each other, so that the light-emitting rate of each light-emitting diode is equal. By increasing the number of the light-emitting diode with a low light-emitting rate and reducing the number of the light-emitting diode with a high light-emitting rate, not only the resolution of the display screen will be reduced, but also the circuit layout in the OLED display panel will be changed, which is not conducive to the development of the OLED display.

In the technical solutions of the present disclosure, the drive current regulating circuit of the existing light-emitting diode is improved, and the current regulating module is triggered according to the turned-on state of the elements in the current input module. Through the current regulating module, the input voltage transmitted from the current input module is combined with the power supply voltage that is transmitted into the current regulating module when the current regulating module is turned on, so that the drive voltage output to the current output module will be increased, thereby increasing the drive current output to the light-emitting diode. In this way, the drive current of the light-emitting diode can be changed without changing the distribution area of the light-emitting diode in the display panel, which not only reduces the production cost and the design cost of the drive current regulating circuit, but also avoids the decrease in resolution and ensures the screen viewing.

Figure 1:
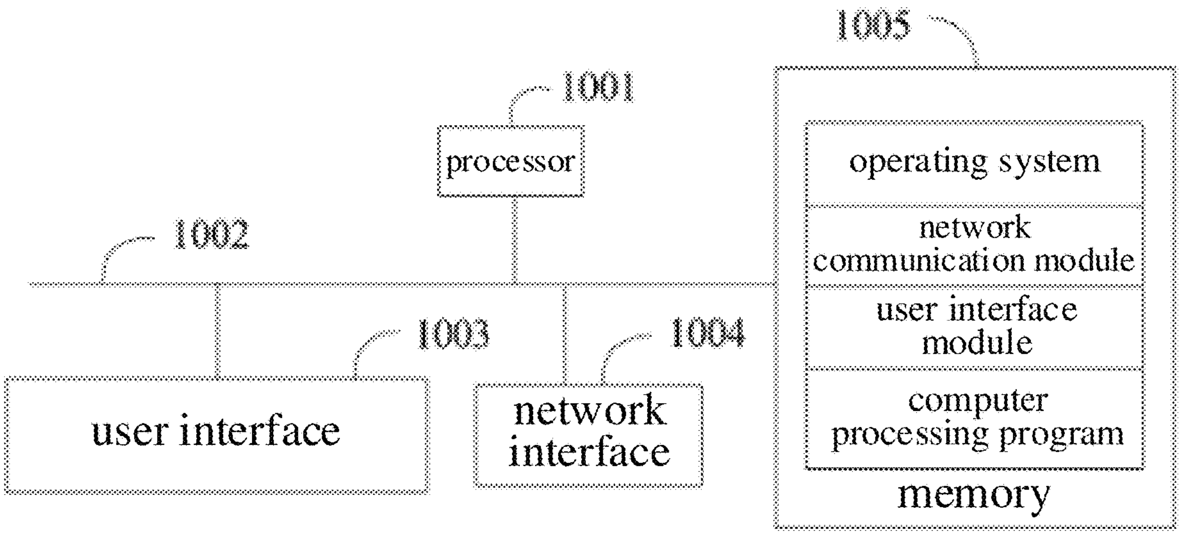
FIG. 1 is a schematic diagram of terminal structures under a hardware operating environment according to an embodiment of the present disclosure.

As shown in FIG. 1, which is a schematic diagram of terminal structures under a hardware operating environment according to an embodiment of the present disclosure.

In an embodiment of the present disclosure, the carrier of the color deviation correction method is the display device. As shown in FIG. 1, the display device may include a processor 1001, such as CPU, a network interface 1004, a user interface 1003, a memory 1005, and a communication bus 1002. The communication bus 1002 is used to realize the connection communication among these components. The user interface 1003 may include a display, and an input unit, such as a keyboard. The user interface 1003 can further include a standard wired interface and a wireless interface. The network interface 1004 can include a standard wired interface and a wireless interface (such as the Wi-Fi interface). The memory 1005 can be a high-speed random access memory (RAM) or a non-volatile memory, such as a disk memory. The memory 1005 can also be the storage device independent of the processor 1001 as mentioned above.

The display device can also include a camera, a radio frequency (RF) circuit, a sensor, an audio circuit, a WIFI module, and the like. The sensor can be a light sensor, a motion sensor, and other sensors. The light sensor may include an ambient light sensor and a proximity sensor. The ambient light sensor can adjust the brightness of the display screen according to the light of the ambient light. The proximity sensor may turn off the display and/or backlight when the mobile terminal moves closed to ears. As a type of motion sensors, the gravity acceleration sensor can measure the acceleration of each direction (usually a three-axis), and can measure the gravity and the gravity direction when in a rest state. Further, the gravity acceleration sensor can be used to recognize the mobile terminal gesture (such as a switch between a landscape mode and a portrait screen mode, related games, magnetometer gesture correction), and can be used to vibrate and recognize related functions (such as a pedometer, drubbing). The mobile terminal can also be equipped with other sensors, such as a gyroscope, a barometer, a hygrometer, a thermometer, an infrared sensor and other sensors, which will not be repeated herein.

Those skilled in the art can understand that the display device structure shown in FIG. 1 does not constitute a limit on the display device, and can include more or less components, or combine certain components, or different components.

As shown in FIG. 1, as a computer storage medium, the memory 1005 may include an operating system, a network communication module, a user interface module, and a computer processing program.

In the terminal shown in FIG. 1, the network interface 1004 is connected to the background server and communicates with the background server. The user interface 1003 is connected to the user terminal to communicate with the user. The processor 1001 can be used to call the computer processing program stored in the memory 1005 and perform the following operations:

determining a switching tube which is turned on in the current regulating module in response to that a resistor in the current input module is switched on, and regulating the input voltage based on the switching tube to obtain a drive voltage, and outputting the drive voltage to a source of the first transistor in the current output module, and compensating for the drive current of the light-emitting diode in the current output module output from the first transistor, to correct a color deviation of the light-emitting diode.

Further, the processor 1001 can call the computer processing program stored in the memory 1005, and perform the following operations:

the determining the switching tube which is turned on in the current regulating module in response to that the resistor in the current input module is switched on, and regulating the input voltage based on the switching tube to obtain the drive voltage including:

determining that the first switching tube in the current regulating module is turned on in response to that the first resistor in the current input module is switched on, and regulating the input voltage of the voltage follower output from the first switching tube to obtain the drive voltage in response to that the first switching tube is turned on.

Further, the processor 1001 can call the computer processing program stored in the memory 1005, and perform the following operations:

the determining the switching tube which is turned on in the current regulating module in response to that the resistor in the current input module is switched on, and regulating the input voltage based on the switching tube to obtain the drive voltage including:

determining that a second switching tube is turned on in the current regulating module in response to that the second resistor in the current input module is switched on, and regulating the input voltage passing through the second switching tube to obtain the drive voltage in response to that the second first switching tube is turned on.

Figure 2:
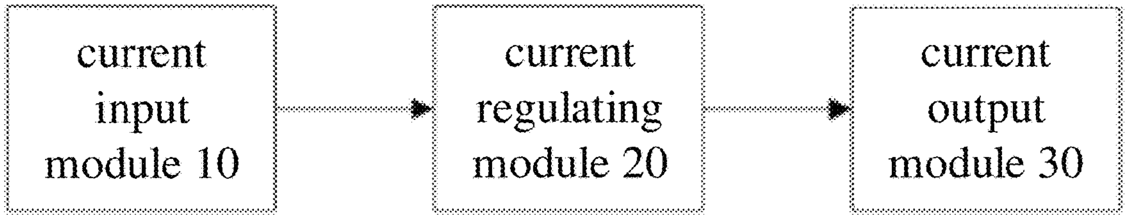
FIG. 2 is a schematic module diagram of a drive current regulating circuit.

As shown in FIG. 2, the present disclosure provides a drive current regulating circuit including a current input module 10, a current regulating module 20 and a current output module 30.

A first terminal of a first resistor R1 in the current input module 10 is used as an input terminal of the current input module 10 for receiving an input voltage Vup, a connection point between a second terminal of the first resistor R1 and a first terminal of the second resistor R2 in the current input module 10 is used as an output terminal of the current input module 10, and is connected to an input terminal of the current regulating module 20. An output terminal of the current regulating module 20 is connected to an input terminal of the current output module 30.

The present disclosure aims to solve the color deviation problem of the display screen caused by different light-emitting rates between the light-emitting diodes. In an embodiment, the drive current regulating circuit applied in the blue light-emitting diode is taken as an example, and in another embodiment, the drive current regulating circuit can be further applied in other light-emitting diode circuit whose light-emitting rate needs to be increased.

Taking the drive current for driving the blue light-emitting diode as an example. During the conventional driver current of the blue light-emitting diode, the pixel area of the blue light-emitting diode is increased and the pixel area of the red light-emitting diode and the green light-emitting diode is reduced, so that the drive current of the blue light-emitting diode is consistent with the drive current of the red light-emitting diode and the green light-emitting diode. In this way, the light-emitting rate of the blue light-emitting diode is equal to the light-emitting rate of the red light-emitting diode and the green light-emitting diode. However, this method is based on the changed circuit layout of the light-emitting diode, and the damaged distribution ratio between the light-emitting diodes will cause the display screen to be distorted, that is, the resolution of the display screen will be reduced, leading to a color separation in three original colors of red, green and blue (RGB) in the display screen.

Based on the above problems in the existing technology, in this embodiment, the drive current circuit for driving the blue light-emitting diode is improved, and the current regulating module 20 is provided in the drive current circuit. Through the current regulating module 20, the input voltage Vup transmitted from the current input module 10 is combined with the power supply voltage that is transmitted into the current regulating module 20 when the current regulating module 20 is turned on, so that the drive voltage output to the current output module 30 will be increased. The drive voltage is for driving the drive current of the blue light-emitting diode, thereby increasing the light-emitting rate of the blue light-emitting diode. In this way, the light-emitting rate of the blue light-emitting diode can be improved without changing the distribution ratio of the existing light-emitting diode.

Figure 3:
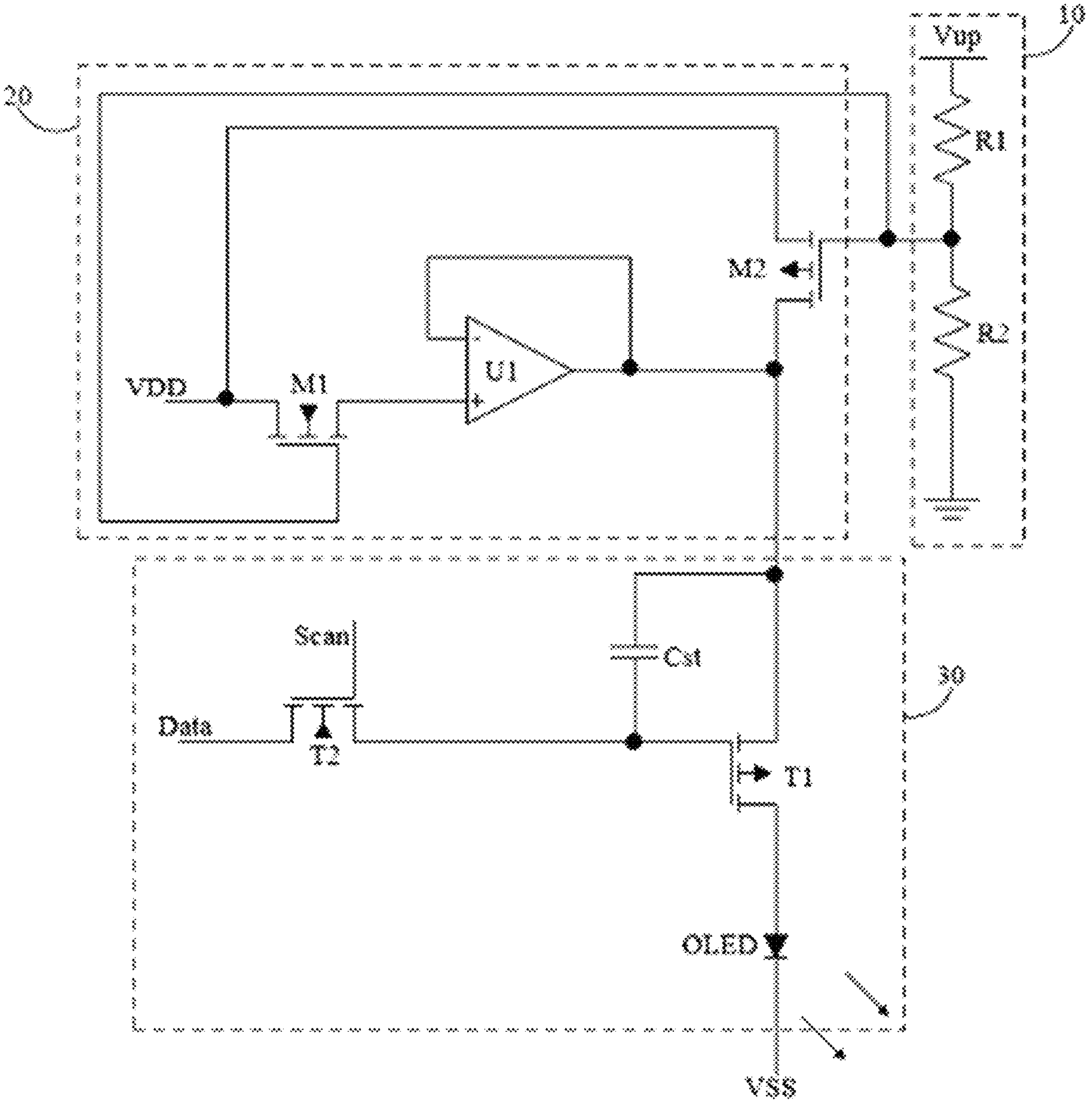
FIG. 3 is a schematic structure diagram of the drive current regulating circuit.

Further, as shown in FIG. 3, when the first resistor R1 is switched on and the second resistor R2 is not switched on, the current regulating module 20 includes a first switching tube M1 and a voltage follower U1. A grid of the first switching tube M1 is connected to the second terminal of the first resistor R1, and a drain of the first switching tube M1 is for receiving a power supply voltage VDD. A source of the first switching tube M1 is connected to a positive input terminal of the voltage follower U1, and an output terminal of the voltage follower U1 is connected to the input terminal of the current output module 30.

As shown in FIG. 3, when the first resistor R1 in the current input module 10 is switched on and the second resistor R2 is not switched on, since the input voltage Vup is received by the first terminal of the first resistor R1, the input voltage Vup passing through the first resistor R1 is at a high level. According to the high level on and low level off characteristic of the first switching tube M1 (the first switching tube M1 is the N tube), the first switching tube M1 is turned on. The source of the first switching tube M1 is connected to the positive input terminal of the voltage follower U1, so that the first switching tube M1 will output the drive voltage which is a combination of the input voltage Vup and the power supply voltage VDD to the voltage follower U1. The voltage follower U1 will output the drive voltage to the current output module 30, to drive the blue light-emitting diode. The resistance value of the first switching tube M1 in the turned-on state is large, so that the voltage follower U1 is accessed to the drive current output terminal of the first switching tube M1, namely the source of the first switching tube M1. When the resistance value is increased, the current of the first switching tube M1 from the power supply voltage VDD terminal will decrease. Therefore, in order to avoid that the large resistance value of the first switching tube M1 in the turned-on state causes the drive current for driving the blue light-emitting diode failed to increase to the preset drive current value, and the light-emitting rate of the blue light-emitting diode is still less than the light-emitting rate of the red light-emitting diode and the green light-emitting diode, the source of the first switching tube M1 is connected the voltage follower U1, to improve the load capacity of the current regulating module 20. In this way, the current loss caused by the large resistance value of the first switching tube M1 in the turned-on state can be avoided, and the drive current of the blue light-emitting diode is equal to the red light-emitting diode and the green light-emitting diode.

Further, when the first resistor R1 is not switched on, the second resistor R2 is switched on, the current regulating module 20 includes a second switching tube M2. A grid of the second switching tube M2 is connected to the first terminal of the second resistor R2, and a source of the second switching tube M2 is for receiving the power supply voltage VDD. A drain of the second switching tube M2 is connected to an input terminal of the current output module 30.

As shown in FIG. 3, when the first resistor R1 is not switched on and the second resistor R2 is switched on, the second resistor R2 is connected between the input voltage Vup and the second switching tube M2. Therefore, the input voltage Vup will pass through the second resistor R2 and be grounded. In this case, the input voltage Vup is at the low level. According to the low level on and high level off characteristic of the second switching tube M2 (the second switching tube M2 is the P tube), the second switching tube M2 is turned on. Based on the connection relationship between the second switching tube M2 and the current output module 30, the drive voltage, which is a combination of the input voltage Vup and the power supply voltage VDD, is output to the current output module 30. Based on the drive voltage, the blue light-emitting diode in the current output module 30 will be driven.

Further, the current output module 30 includes the first transistor T1, the second transistor T2, and the light-emitting diode OLED. The control terminal of the first transistor T1 is connected to an output terminal of the second transistor T2, and an input terminal of the first transistor T1 is connected to the output terminal of the current regulating module 20. An output terminal of the first transistor T1 is connected to a positive electrode of the light-emitting diode OLED, and a negative electrode of the light-emitting diode OLED is grounded. An input terminal of the second transistor T2 is for receiving a data signal Data, and a control terminal of the second transistor T2 is for receiving a scanning signal Scan.

In this embodiment, taking the P-metal-oxide-semiconductor-thin film transistor (PMOS-TFT) as an example, that is, the first transistor TIP is the P-tube.

In the PMOS-TFT structure, when the second transistor is the N-tube and the scanning signal SCAN is at the high level, it means that the light-emitting rate of the blue light-emitting diode is driven. In this case, the second transistor T2 is turned on based on the high level scanning signal SCAN. Since one terminal of the storage capacitor Cst is connected to the connection point between the source of the second transistor T2 (namely the output terminal of the second transistor T2) and the gate of the first transistor T1 (namely the control terminal of the first transistor T1), the voltage value of the connection point is greater than the voltage value inside the storage capacitor Cst when the second transistor T2 is turned on, and the voltage output from the second transistor T2 will be output to the storage capacitor Cst. In this case, the gate of the first transistor T1 (namely the control terminal of the first transistor T1) is at the low level. Based on the low level on and high level off characteristic of the first transistor T1, it is determined that the light emitting rate of the blue light-emitting diode is driven. In this case, the first transistor T1 is turned on, and the drive voltage input from the current regulating module 20 is transmitted to the drain (namely the output terminal of the first transistor T1) via the source (namely the input terminal of the first transistor T1), to output the drive current to the light-emitting diode OLED connected to the drain. In this embodiment, the light-emitting diode OLED is the blue light-emitting diode.

From the above description, it can be understood that the drive voltage is equal to the voltage which is a combination of the input voltage Vup and the power supply voltage VDD, and the input voltage Vup is the system voltage in the OLED display. The power supply voltage VDD is added to the system voltage to compensate for the drive current of the blue light-emitting diode, so that the drive current of the blue light-emitting diode can be equal to the drive current of the red light-emitting diode and the green light-emitting diode. Therefore, in this embodiment, the light-emitting rate of the blue light-emitting diode can be equal to the light-emitting rate of the red light-emitting diode and the green light-emitting diode.

In addition, the N-metal-oxide-semiconductor-thin film transistor can also be taken as an example. That is, the first transistor T1 is the N-tube. When the first transistor T1 is the N-tube, the input terminal of the first transistor T1 is the drain, and the output terminal of the first transistor T1 is the source.

Further, the current output module 30 also includes a storage capacitor Cst.

A first terminal of the storage capacitor Cst is connected to a connection point between the first transistor T1 and the current regulating module 20, and a second terminal of the storage capacitor Cst is connected to a connection point between the first transistor T1 and the second transistor T2. The storage capacitor Cst is used for storing the voltage transmitted from the second transistor T2 when the second transistor T2 is turned on, and for releasing the storage voltage the second transistor T2 is turned off.

Figure 4:
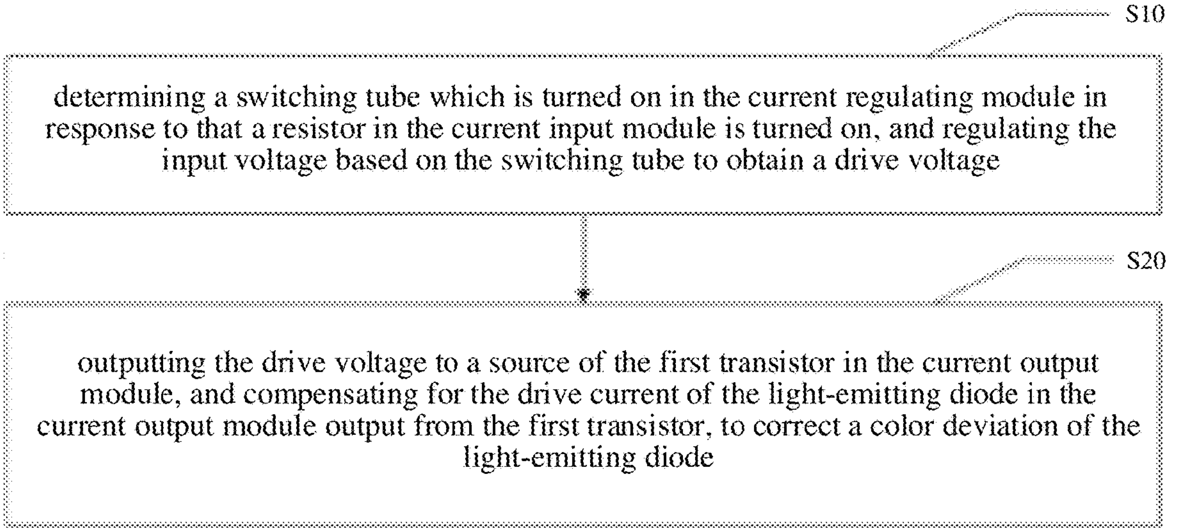
FIG. 4 is a schematic flowchart of a color deviation correction method according to an embodiment of the present disclosure.

As shown in FIG. 4, an embodiment of the present disclosure provides a color deviation correction method including following operations.

Operation S10, determining a switching tube which is turned on in the current regulating module in response to that a resistor in the current input module is switched on, and regulating the input voltage based on the switching tube to obtain a drive voltage.

As shown in FIG. 3, determining whether the switching tube is turned on in the current regulating module in response to that the resistor in the current input module is switched on. For example, when the first resistor is switched on, it is determined that the first switching tube is turned on. When the second resistor is switched on, it is determined that the second switching tube is turned on. Whether the first resistor and the second resistor being switched on depend on the stability of the drive current regulation circuit. When stability is low, in order to avoid the current loss caused by the stability, the first resistor needs to be switched on, and the input voltage will be regulated based on the first switching tube that is turned on when the first resistor is switched on, to obtain the drive voltage. When stability is high, there is no current loss, and the second resistor needs to be switched on, then the input voltage will be regulated based on the second switching tube that is turned on when the second resistor is switched on, to obtain the drive voltage.

Figure 5:
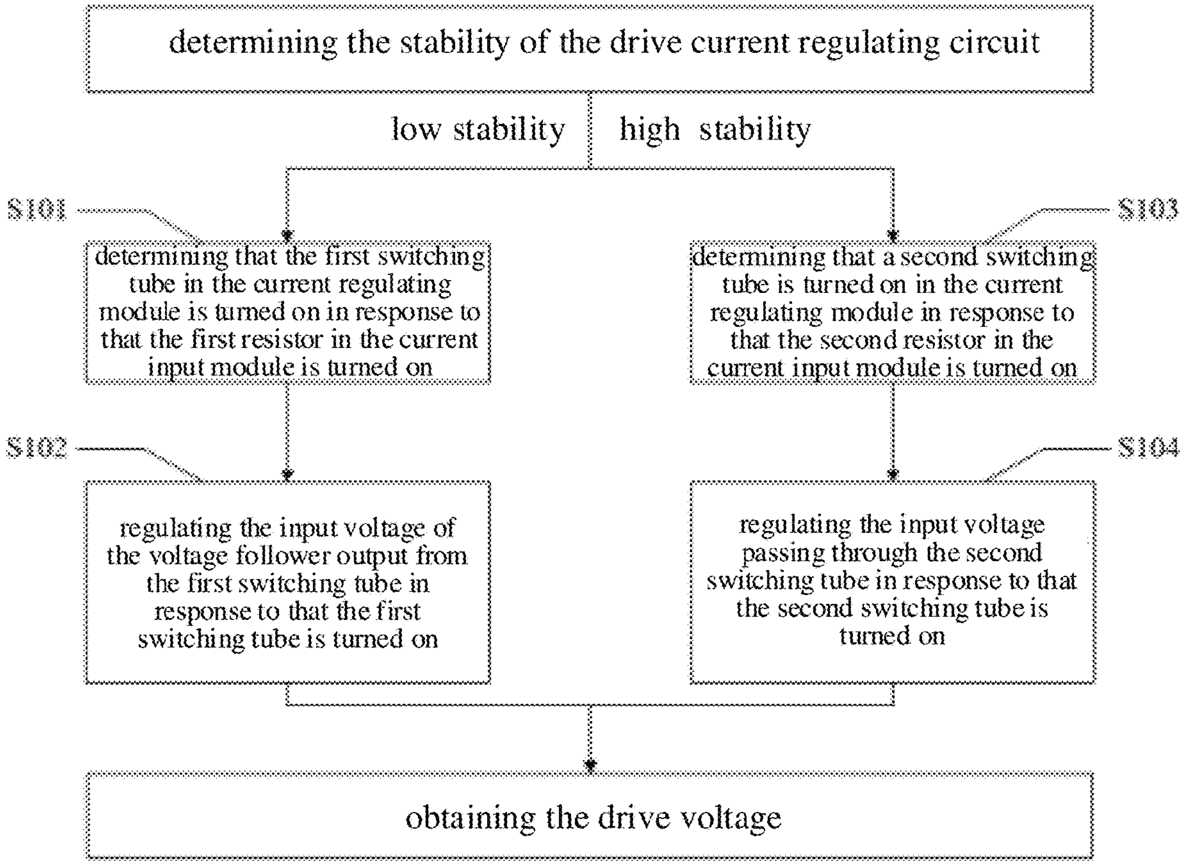
FIG. 5 is a detailed schematic flowchart of operation S10 in FIG. 4.

As shown in FIG. 5, the operation S10, determining the switching tube which is turned on in the current regulating module in response to that the resistor in the current input module is switched on, and regulating the input voltage based on the switching tube to obtain the drive voltage including following operations.

Operation S101, determining that the first switching tube in the current regulating module is turned on in response to that the first resistor in the current input module is switched on, and Operation S102, regulating the input voltage of the voltage follower output from the first switching tube to obtain the drive voltage in response to that the first switching tube is turned on.

Determining the stability of the drive current regulating circuit, and when the stability of the drive current regulating circuit is low, the first resistor will be switched on, and the first switching tube in the current regulation module will be turned on. Based on the voltage follower connected to the first switching tube, the load carrying capacity of the drive current regulation circuit can be improved, to avoid the current loss caused by low stability.

When the first resistor is switched on, the input voltage with a high level will make the first switching tube turned on. Since the power supply voltage is received by the drain of the first switching tube, the input voltage will be regulated based on the power supply voltage. That is, the input voltage will be compensated based on the power supply voltage. After the drive voltage is obtained, the drive voltage will be sent to the voltage follower, to enable the voltage follower to output the drive voltage without current loss.

S10, determining the switching tube which is turned on in the current regulating module in response to that the resistor in the current input module is switched on, and regulating the input voltage based on the switching tube to obtain the drive voltage includes following operations.

Operation S103, determining that a second switching tube is turned on in the current regulating module in response to that the second resistor in the current input module is switched on.

Operation S104, regulating the input voltage passing through the second switching tube to obtain the drive voltage in response to that the second switching tube is turned on.

When the stability of the drive current regulating circuit is not low, the second resistor will be switched on. Since the second resistor is connected between the input voltage and the second switching tube, the input voltage will pass through the second resistor and be grounded. In this case, the input voltage is at the low level that can make the second switching tube turned on. The power supply voltage is received by the source of the second switching tube, so that the input voltage can be regulated based on the power supply voltage. That is, after the input voltage is compensated based on the power supply voltage, the drive voltage can be obtained.

Operation S20, outputting the drive voltage to a source of the first transistor in the current output module, and compensating for the drive current of the light-emitting diode in the current output module output from the first transistor, to correct a color deviation of the light-emitting diode.

In this embodiment, the drive current output to the existing light-emitting diode cannot make the light-emitting rate of the blue light-emitting diode equal to the light-emitting rate of the red light-emitting diode and the green light-emitting diode. Therefore, the existing drive current needs to be compensated, to make the drive current value of the blue light-emitting diode equal to the drive current value of the red light-emitting diode and the green light-emitting diode. In this embodiment, the drive current is compensated based on the drive voltage. Since the drive current is obtained on the basis that the input voltage is compensated by the power supply voltage, the light-emitting rate of the blue light-emitting diode can be equal to the light-emitting rate of the red light-emitting diode and the green light-emitting diode. In this case, the color deviation in the display screen caused by the insufficient light-emitting rate of the existing light-emitting diode can be corrected.

In this embodiment, the input voltage is regulated in response to that the switching tube is turned on, to obtain the compensated voltage, namely the drive voltage. The drive voltage is output from the first transistor to the light-emitting diode, and the drive current is for driving the light-emitting diode. Compared to the conventional operation that the light-emitting diode is driven by the input voltage and the light-emitting rate is insufficient, the drive voltage in the present disclosure can increase the drive current to improve the light-emitting rate. In this way, the light-emitting rate can be improved without changing the distribution ratio of the exiting light-emitting diode, which not only avoids the color deviation of the display screen, but also ensures the stability of the resolution.

In addition, the present disclosure further provides a display device including a memory, a processor, and a computer processing program stored in the memory and executable on the processor. When the computer processing program is executed by the processor, the color deviation correction method as mentioned above is implemented.

In addition, the present disclosure further provides a computer-readable storage medium. The computer processing program is stored in the computer-readable storage medium, and when the computer processing program is executed by a processor, the color deviation correction method as mentioned above is implemented.

It should be understood that, in the present disclosure, the terms "including", "includes" or any other variants are used for covering non-exclusive contents, so that a series of processes, methods, items are all incorporated herein. Or the system not only includes those elements, but also includes other elements that are not clearly listed, or further includes the elements inherent in the process, the method, the item or the system. Without more restrictions, the elements limited by the description "include one . . . " are not intended to exclude additional same elements in the process, the method, the item, or the systems.

The serial numbers of the present disclosure are only for description, and do not represent the advantages and disadvantages of the embodiments.

Those skilled in the art can understand that all or part of the above embodiments can be implemented by instructing the software and the general hardware platform, and can also be implemented by the hardware. In many cases, the former is better for implementation. The essence or the part contributing to the related art of the technical solutions of the present disclosure can be embodied in the form of a software product. The computer software product can be stored in the storage medium (such as a read-only memory or a random access memory, a disk, and an optical disk) as mentioned above, and may include several instructions to cause a device (which may be a mobile phone, a computer, a server, an air conditioner, or a network device, and the like) to execute all or part of the operations of the methods described in the various embodiments of the present disclosure.

The above-mentioned embodiments are only some embodiments of the present disclosure, and are not intended to limit the scope of the present disclosure. Any equivalent structure conversion or equivalent process conversion made with reference to the description and the accompanying drawings of the present disclosure, directly or indirectly applied in other related technical fields, should all fall in the scope of the present disclosure.

What is claimed is:

1. A drive current regulating circuit, configured to regulate a drive current of a blue light-emitting diode, wherein the drive current regulating circuit comprises: a current input module, a current regulating module and a current output module, a first terminal of a first resistor in the current input module is used as an input terminal of the current input module for receiving an input voltage, a connection point between a second terminal of the first resistor and a first terminal of a second resistor in the current input module is used as an output terminal of the current input module, and is connected to an input terminal of the current regulating module, an output terminal of the current regulating module is connected to an input terminal of the current output module, in response to that the first resistor is switched on and the second resistor is not switched on, the current regulating module comprises a first switching tube and a voltage follower, a grid of the first switching tube is connected to the second terminal of the first resistor, and a drain of the first switching tube is for receiving a power supply voltage, a source of the first switching tube is connected to a positive input terminal of the voltage follower, and an output terminal of the voltage follower is connected to the input terminal of the current output module, in response to that the first resistor is not switched on and the second resistor is switched on, the current regulating module comprises a second switching tube, a grid of the second switching tube is connected to a first terminal of the second resistor, a source of the second switching tube is for receiving the power supply voltage, and a drain of the second switching tube is connected to the input terminal of the current output module, whether the first resistor and the second resistor being switched on depend on stability of the drive current regulation circuit.

2. The drive current regulating circuit of claim 1, wherein:

the current output module comprises a first transistor, a second transistor, and a light-emitting diode, a control terminal of the first transistor is connected to an output terminal of the second transistor, an input terminal of the first transistor is connected to the output terminal of the current regulating module, an output terminal of the first transistor is connected to a positive electrode of the light-emitting diode, and a negative electrode of the light-emitting diode is grounded, and an input terminal of the second transistor is for receiving a data signal, and a control terminal of the second transistor is for receiving a scanning signal.

3. The drive current regulating circuit of claim 2, wherein:

the current output module further comprises a storage capacitor, and a first terminal of the storage capacitor is connected to a connection point between the first transistor and the current regulating module, and a second terminal of the storage capacitor is connected to a connection point between the first transistor and the second transistor.

4. A color deviation correction method, applied in the drive current regulating circuit of claim 1, wherein the drive current regulating circuit is configured to regulate a drive current of a blue light-emitting diode, and the color deviation correction method comprises:

determining that the first switching tube in the current regulating module is turned on in response to that the first resistor in the current input module is switched on, regulating the input voltage output from the first switching tube to the voltage follower, to obtain a drive voltage in response to that the first switching tube is turned on, and outputting the drive voltage to a source of a first transistor in the current output module, and compensating for a drive current of a light-emitting diode in the current output module output from the first transistor, to correct a color deviation of the light-emitting diode.

5. The color deviation correction method of claim 4, wherein before the outputting the drive voltage to the source of the first transistor in the current output module, and compensating for the drive current of the light-emitting diode in the current output module output from the first transistor, to correct the color deviation of the light-emitting diode, the color deviation correction method further comprises:

determining that the second switching tube is turned on in the current regulating module in response to that the second resistor in the current input module is switched on, and regulating an input voltage passing through the second switching tube to obtain the drive voltage in response to that the second first switching tube is turned on.

6. A display device, comprising:

a memory;

a processor; and a computer processing program stored in the memory and executable on the processor, wherein when the computer processing program is executed by the processor, the color deviation correction method of claim 4 is implemented.

7. A non-transitory computer-readable storage medium, wherein a computer processing program is stored in the non-transitory computer-readable storage medium, and when the computer processing program is executed by a processor, the color deviation correction method of claim 4 is implemented.

* * * * *